Nov. 27, 1962 M. M. SURI 3,065,653
POWER TRANSMISSION UNIT
Filed April 6, 1960 3 Sheets-Sheet 1

Inventor
MAN MOHAN SURI
By
Attorney

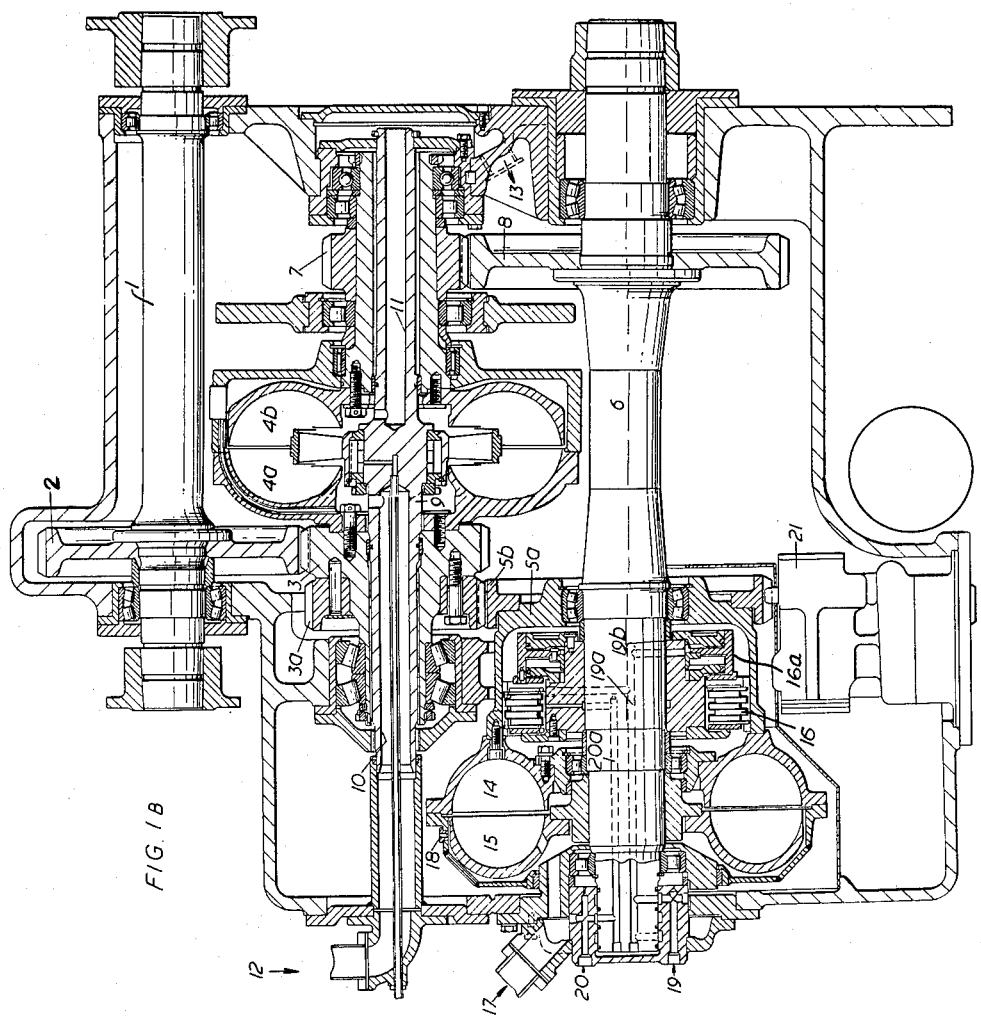

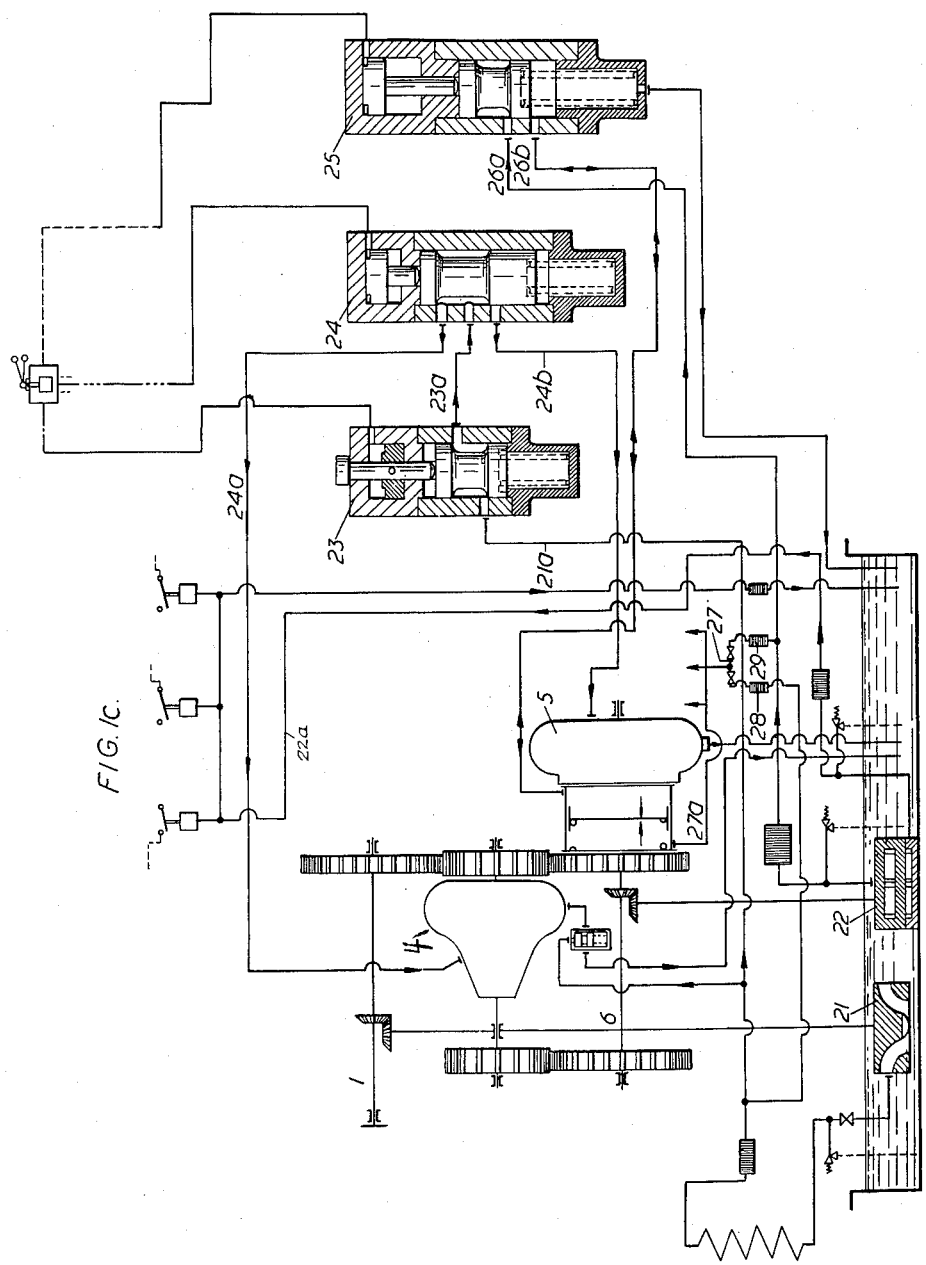

3,065,653
POWER TRANSMISSION UNIT
Man Mohan Suri, District Burdwan, Chittaranjan,
West Bengal, India
Filed Apr. 6, 1960, Ser. No. 20,293
10 Claims. (Cl. 74—720)

This invention relates to power transmission units more particularly suitable for use with primemovers employed in vehicles and developing high horsepowers such as from 200 to 2000 H.P.

It is the principal object of this invention that the continuity of power transmission during the change over is maintained with the prime mover running at full power, while at the same time shock loading of all components of the transmission as well as the prime mover is avoided. It is also the object of this invention that not only a high efficiency of transmission is achieved, but the weight and size of the transmission unit resulting from the present invention is also reduced, and yet long life as well as operational reliability can be achieved which is of prime importance to rail traction.

Fluid type torque convertors have been known to be connected in such a manner that after the required acceleration has been achieved through the said convertor, the power is transmitted through a coupling which may be either of the fluid type or of the mechanical type. In a rigid or mechanical coupling, the input and the output speed and torque are equal and the efficiency of transmission can be 100%. When using a fluid coupling, the efficiency of transmission is determined by the ratio of input and output speed in the coupler. To achieve an efficiency approaching even about 98%, a fluid coupling of very large diameter is essential in the case of transmission of high horse powers. Such a construction is, however, disadvantageous because of the large rotating masses involved, leading to heavier and therefore more costly construction of all the components of the transmission unit. This factor is particularly important in rail traction vehicles because it is essential that the transmission unit should be light in weight, compact in construction and easy to operate.

Although the advantages of higher efficiencies of mechanical transmissions have been well known their applications on rail traction units have been limited to units of a maximum of 400–500 H.P. Application to larger units presents some basic difficulties in rail traction. It is these basic difficulties which the applicant has successfully solved by virtue of his design.

A popular mode of coupling mechanically is the clutch system. The handicap of a clutch can be demonstrated. Take for example the case when a train is picking up speed. At the instant of change-over from one line of transmission to the other, the input and the output shafts to be coupled by the clutch are moving at different speeds. Thus when the two shafts are suddenly coupled, considerable momentum of the input shaft, the primary gears and the engine, all forming the primary parts, has to be destroyed, because the speed of the input shaft must be reduced to synchronise with the speed of the output shaft through the clutch. The "shock load" generated through change of momentum is inversely proportional to the time taken to effect the change. Therefore, if the clutch closes suddenly to effect coupling in an instant, the "shock load," especially in cases of high horsepowers is bound to damage the transmission parts and possibly the diesel engine. On the other hand, in a plate clutch, e.g. if the engagement of the said clutch is effected slowly and the slip between the clutch plates is gradually reduced till synchronisation is achieved, then the plates of the clutch become subject to considerable wear necessitating frequent maintenance. Such solutions for rail traction have not been found satisfactory. The users therefore prefer electric and hydraulic transmissions where frequent maintenance is unnecessary and the parts do not wear, or require renewal for periods of a few years in spite of intensive use.

Another means employed to obviate these difficulties is by the interruption of power from the engine when changing from one to another line of transmission as in the case of automobiles or light railcars. In rail traction especially, where the weight to be pulled is high compared to installed horse-power, this interruption of power is unfavorably looked upon. When a train is accelerating, especially on a gradient, and the speed has been achieved where a change of gear is required, any interruption of power will instantly slow down the train. This solution of interruption of power is therefore not favoured. It is necessary to maintain continuity of tractive effort from zero to 100% road speed.

Further in the cases aforesaid, during the changeover operation from one to the other line of transmission, care has also to be taken to reduce the fuel supply to the diesel engine, because if this is not done then during the momentary total sudden disconnection of the engine, the diesel engine and all primary components of the transmission would shoot up in speed. This will aggravate the difficulties in engagement of the mechanical coupling.

The types of mechanical couplings used in rail traction today are either friction plate clutches, claw clutches, or bandbrake type with epicyclic gearing. All these devices achieve high efficiency of transmission, but result in disadvantages already mentioned, thereby limiting their use to low horsepower vehicles only. When however a hydraulic coupling is used in high horse powered vehicles, such as 1000 horsepower as commonly used with railway locomotives, the efficiency of transmission drops below that what can be achieved with a mechanical transmission. Any effort made to improve the efficiency of hydraulic coupling results in an increased weight and bulk of the transmission which is a serious limitation in the design of the rail vehicles.

A satisfactory design of a mechanical coupling that could be engaged or disengaged when the vehicle is in motion has so far not been achieved by any manufacturer. It is the principal object of this invention to propose a system of transmission in which the vehicle employing large horse power is initially driven through a fluid line of transmission. Thereafter, transmission of power is effected through a direct mechanical line of transmission without the risk of involving any damage to the primemover even when during the engagement of the mechanical transmission, a gear ratio change is effected.

The applicant has according to his invention proposed to use in one line of power transmission a fluid-cum-mechanical coupling wherein the characteristic feature is that the fluid coupling is a small and inefficient fluid coupling (with high slip) and the housing of the said fluid coupling forms one part of the mechanical transmission means. This fluid mechanical coupling is employed in parallel with a purely fluid line of power transmission. This combination results in a transmission unit which solves the problems enumerated earlier. In the fluid-mechanical coupling the fluid coupling is of the high slip type so that its size can be small and this exactly meets the requirements both of operation as well as cost. In this fluid-mechanical coupling the fluid coupling part only functions as a synchroniser at the proper stage in operation.

The invention will now be more fully described with reference to the enclosed drawings:

FIG. 1B shows the actual construction of the transmission unit in section.

FIG. 1C shows diagrammatic view of the transmission unit of FIG. 1B together with the controls some of which are shown in section.

Figure 1:
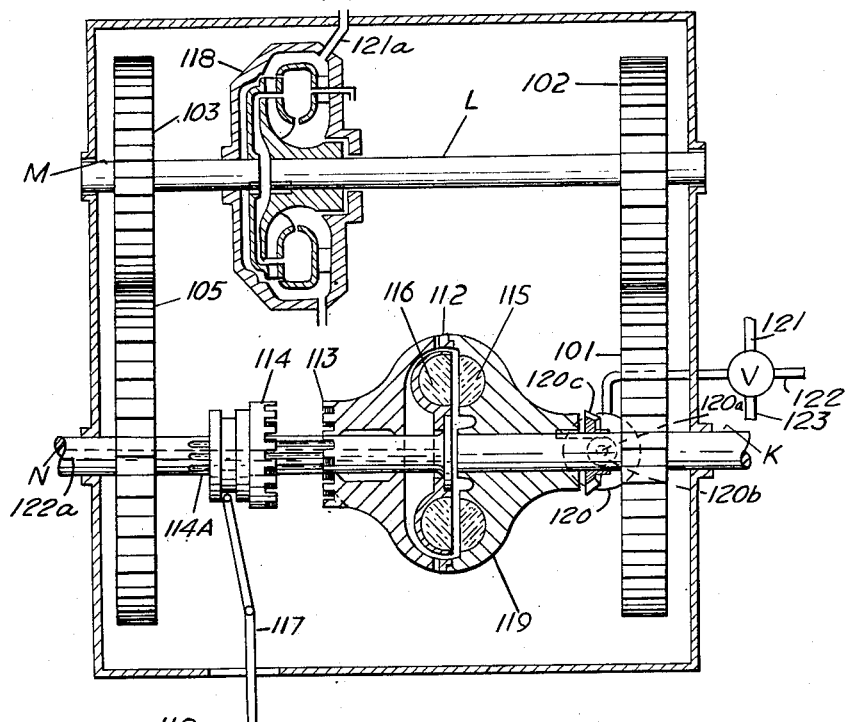
FIG. 1 shows a schematic view in part section of two parallel lines of power transmission.

Referring to FIG. 1, K is the input shaft on which is mounted a gear wheel 101 meshing with a gear wheel 102 on shaft L of a fluid line of transmission comprising a hydraulic torque convertor unit marked 118. M is the output shaft of said convertor and on this is mounted a gear wheel 103 which in turn drives gear wheel 105 on the main output shaft N.

The shafts L and M and the hydraulic torque convertor 118 constitute one fluid line of power transmission.

Referring to the other parallel line of power transmission according to this invention, this is constituted by the input shaft K on which is rigidly mounted a casing 112 of a fluid coupling unit. The casing 112 holds a set of primary blades 115 while the secondary blades 116 are fixedly mounted on the end of the output shaft N within the casing.

The engagement of the input shaft K with the output shaft N is effected by filling the casing 112 with a fluid. A certain amount of slip will continue to occur even after engagement of the input and the output shafts through the fluid coupling. A positive clutch member 114 mounted on shaft N through splines 114A is actuated by a lever 117 causing the same to slide towards clutch part 113 mounted on the casing to cause positive engagement of the input and the output shafts. This positive coupling eliminates the fluid slip and the transmission power losses.

The fluid coupling in this arrangement acts as a partial synchronizer between the input and the output shafts without causing shock to the prime mover. It is imperative that the positive clutch should be engaged only some time after the fluid coupling has been in action.

To disengage the input from the output shaft, lever 117 is operated to disengagement position and the fluid from the casing 112 is emptied.

The means for selection of any of said power lines comprises a device 120 indicated in plan view below the shaft K for supplying the hydraulic fluid, such as a centrifugal pump, to a selective valve V having an outlet 121 connected to the inlet 121a of the hydraulic torque converter 118, an outlet 122 connected to the inlet 122a of the casing 112 of the fluid coupling unit 119 and an outlet 123 recycling the hydraulic fluid to the sump, thus relieving the pressure on the fluid to the two fluid transmission means. The pump 120 is driven by a shaft 120a having a bevel gear 120b driven by a bevel gear 120c mounted on shaft K. Such an arrangement may conveniently be of the type described in my copending application No. 668,446, filed June 27, 1957, now Patent No. 2,949,793.

Figure 1A:
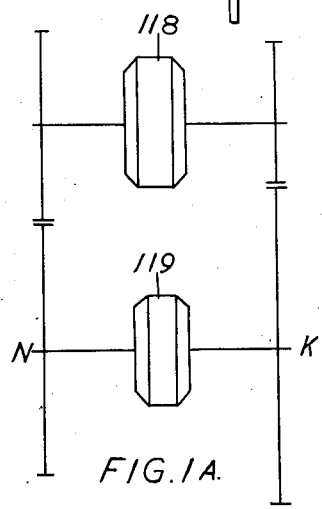
FIG. 1A shows a line diagram of the transmission of FIG. 1.

Referring to FIG. 1A, the hydraulic torque convertor 119 is the fluid mechanical coupling constructed and arranged according to my invention.

Referring to the operation, to start with, none of the device 118 or 119 is engaged with the output shaft. Fluid is first supplied to the torque convertor 118 and when the vehicle has picked up some speed the fluid is supplied to the fluid mechanical coupler 119, at the same time emptying the fluid from the torque convertor 118 so that power is supplied through 119 to the output shaft N.

From FIG. 1 it is clear that initially when the fluid is filled into the torque convertor 118, keeping the mechanical coupling housing 112 empty, torque is being transmitted to the output shaft N through 101, 102, L, 118, M, 103 and 105. The speed of N with respect to K is low. When mechanical coupling has to be engaged, fluid torque convertor 118 is emptied and the coupling housing 112 and 119 filled. The coupling now caused between 115 and 116 hydraulically would overload the input shaft K and consequently the engine, thereby bringing down the speed of the engine as well as input shaft K to a value near that of the speed of the output shaft N whereby the clutch parts 113 and 114 can be engaged thus establishing a purely mechanical line of power transmission without the risk of causing damage to the prime mover or shock to the transmission component. Thus the mechanical coupling incorporating partial synchronizing means constructed according to my invention is constructionally and functionally different to the known coupling used in existing transmission systems.

In my invention the fluid synchronizing device is not meant to transmit power with any great efficiency and therefore it need not be of such dimensions as would be necessary if it were to transmit power. The fluid coupling is of very small dimensions and will replace couplers of high efficiency and of relatively large dimensions. Such a device will normally be regarded as inefficient for power transmission because of the high losses in slip.

In FIG. 1B, the input shaft 1 is connected to the engine (not shown). This shaft carries a gear wheel 2 which is in constant mesh with the primary parts 4a of the torque convertor and the coupling housing 5a through the gear wheels 3, 3a. The secondary part 4b of the torque convertor is connected to the output shaft 6 through constant mesh gear wheels 7 and 8.

On a carrier shaft 9 which is stationary, are rotatably mounted the primary and the secondary parts 4a and 4b of the torque convertor. This shaft has a hollow passage 10 through which the oil for the torque convertor flows in and 11 is the passage through which the oil of the torque convertor flows out. 12 is the inlet and 13 is the outlet for the oil.

The housing 5a of the mechanical coupling includes primary blades 14 of a high slip partial synchronising fluid coupling. The secondary blades 15 of this fluid coupling are fixedly mounted on output shaft 6. The housing 5a also includes a plate clutch 16 such that when this clutch is operated housing 5a is positively engaged with the output shaft 6 through the said plate clutch 16.

17 is the inlet passage for filling the fluid into the said fluid coupling. At 18 is provided a small outlet for excess oil to flow out. 19 is the inlet passage for oil under pressure to be transmitted to the clutch 16 through a hollow passage 19a in the output shaft 6 to effect positive engagement of the plate clutch 16 by admitting oil to the pressure chamber 19b to move piston 16a of the plate clutch 16.

When however the pressure of the oil in the inlet passage or pipe line 19 is dropped and oil is admitted through the pipe line 20, it reaches the plate clutch 16 through passage 20a and disengages the plate clutch by moving piston 16a.

21 is an oil pump which is in constant mesh with the input shaft 1 through gear wheels 5b, 3a, 3 and 2. Gear wheel 5b is fixedly mounted on the housing 5a of the coupling. It will therefore, be seen that whenever the prime mover is in motion, the oil pump 21 is functioning.

FIG. 1C is a schematic diagram of the controls of the transmission of FIG. 1B. The operating controls of this transmission are hydropneumatic whereas the safety controls are electro-magnetic. 21 is the oil pump operated by the input shaft 1 as described above. 22 is a gear oil pump connected to the output shaft 6. This pump is not shown in FIG. 1B. At 23, 24 and 25 are three control valves of the hydro-pneumatic type.

In the cab of the driver is provided a control handle which in a predetermined position causes air under pressure to be admitted to the master control valve 23, which is spring loaded, and causes the same to open thereby enabling oil from pump 21 to flow through 21a and pass through the master valve 23 into a distribution control valve 24 through pipe 23a. The control valve 24, in the normal position shown, provides a passage for the fluid to flow to the torque convertor 4 through passage 24a. This enables the said torque convertor 4 in the transmission to be engaged and commence operation. This constitutes the fluid line of power transmission.

After a predetermined speed of the vehicle has been reached, the driver further operates the control handle which causes air pressure in the spring loaded control 24 to so actuate the same that the supply of fluid to the torque convertor 4 ceases and instead the oil starts flowing through passage 24b into the fluid-mechanical coupling (synchronising device) 5. By this means the torque convertor 4 empties. However, by the time the torque convertor empties, the fluid coupling 5 is already filled with fluid and comes into function. The fluid coupling 5 is so designed that it is of a relatively small diameter thereby having the characteristic of transmitting torque at a high slip value (15–20%) under the full speed and power of the prime mover. Due to the engagement of this fluid coupling, the prime mover is loaded and because of the very great inertia at the output shaft which is already connected to the train load in motion, the fluid coupling acting with high slip brings down the speed of the prime mover gradually and without shock of the input shaft connected to the prime mover, thereby functioning as a partial synchroniser.

The usual traction low slip type fluid coupling is not used because besides its having the disadvantage of being larger in size for the same capacity, it would also tend to cause shock to the transmission parts because with limited slip it will function virtually like a rigid coupling at that speed of the vehicle.

Having thus disengaged the fluid line of transmission and momentarily engaged the high slip fluid coupling, the relative speeds of the input and the output shafts now lie within a convenient and safe range for application of positive engagement through the plate clutch. At this stage the driver further operates the handle to such a position that air pressure actuates control valve 25 which causes the oil to flow under pressure from the pipe 26a to pipe 26b which causes engagement of the plate clutch 16 by pressure generated in pressure chamber 19b (FIG. 1B). It may be pointed out here that this oil under pressure is obtained from gear pump 22 which is connected with the output shaft 6 and therefore a pressure for engagement of the mechanical coupling is only available when the vehicle is in actual motion.

It will be noticed that in FIG. 1B a passage 20 is provided for the flow of fluid to ensure disengagement of the plate clutch 16. This passage 20 is fed from a one way differential pressure valve 27 (FIG. 1C) which can accept entry of oil either from the centrifugal pump 21 or from pump 22 depending upon whichever line is under higher pressure than the other. However by the use of properly regulated throttle valves 28 and 29 the pressure developed in pipe line 27a is low. 27a is connected to pipe 20 of FIG. 1B. The pressure in the pipe 20 is therefore sufficient to cause a flow of fluid through passage 20a only when the pressure in pipe line 19 is nil i.e. when valve 26 is held in the no-engagement position of the mechanical coupling.

On the engagement, in the manner outlined above, of the positive clutch, power is now transmitted from the input to the output shaft purely through mechanical means and at maximum possible efficiency.

FIG. 1C also shows pipeline 22a which is fed from the secondary pump 22. Since the secondary oil pump 22 is connected to the output shaft, which in turn is connected to the wheels of the vehicle, the speed of the said secondary pump is directly proportional to the road speed of the vehicle. Therefore, the pressure generated in the oil pipe 22a which depends on the speed of rotation of the secondary pump 22, indicates in a way the speed of the vehicle. As shown in FIG. 1C, on the pipe 22a any number of safety or other operational relays can be mounted each acting at a different pressure in the pipeline. For example, if it is desired that the mechanical coupling must never engage below a vehicle speed of 40% road speed, an oil pressure operated electro-magnetic relay could be fitted on the pressure pipeline 22a such that the relay locks the entry of compressed air into the control valve 25 until such time that the vehicle has attained a speed of 40% and the pipe 22a developed sufficient pressure. Similarly to prevent overspeeding of the vehicle, another relay could be fitted to operate at the maximum desired speed of the vehicle. This electro-magnetic relay working on the pressure of the pipeline 22a could be actuated at the maximum desired pressure of the said pipeline and the relay could lock the entry of air into all the control valves thereby making the control valves return to the transmission "dead position." Besides thus cutting out the transmission from the engine, the same relay could also actuate the vehicle brakes to reduce the speed of the vehicle. In FIG. 1C, these relays are shown to operate from the secondary oil pump pipeline 22a which means that they are working against oil pressure which actually indicates the vehicle road speed.

If however, it is desired that these relays work purely electrically, then any of known electrical speed measuring devices could be adopted to actuate these relays at different speeds of the vehicle. Even a purely mechanical centrifugal or other known device could be used for the operation of these relays if so desired.

The transmission outlined above may now be critically considered. The gear ratios can be conveniently arranged so that the fluid torque convertor when filled accelerates the vehicle to about 70% of the maximum road speed with the engine running at full power and at full speed. The direct mechanical line is therefore intended to come into function at the range of 70% to 100% road speed of the vehicle.

At start the said torque convertor is filled with fluid while the direct mechanical line is kept fully disengaged up to the time the vehicle speed reaches 70%. At this time the two complementary parts of the mechanical coupling are running at different speeds. The primary part attached to the engine is running at 100% speed while the secondary part attached to the output shaft is running only at 70% speed. To change from the hydraulic torque convertor circuit to the mechanical line, the flow of fluid to the torque convertor is interrupted and at the same time the fluid is allowed to enter the housing of the fluid mechanical coupling which houses a high slip small size-fluid coupling, for example with a slip of about 15%. As is well known, the fluid coupling with 15% slip will be much smaller in size and weight than a conventional traction fluid coupling for rail traction with 4–6% slip only. A 15% slip coupling is very soft in its action and therefore when fluid is filled into this coupling, its effect is gradual without causing shock to any parts, a feature of great significance in cases of high horse powers. The use of this small coupling having a high slip solves the following problems immediately for rail traction:

(i) The size of this coupling and its weight, and hence the weight of the transmission unit is reduced. The design is simple and compact which are important factors for rail traction transmission.

(ii) The changeover from the fluid torque converter to the fluid coupling even when carried out within a minimum of time would not cause any shock to the components of the transmission because the very high slip coupling used is soft in action.

(iii) There is no interruption of torque and the change is carried out with the engine running at full power and speed.

(iv) Because the fluid coupling has a high slip, it is not important that the torque convertor should empty instantly and the coupling filled slowly to avoid the two circuits with different gear ratios working in opposition to each other as in the case of known transmission. Thus no complicated mechanism is required. It is not necessary to have accurate time controls for filling and emptying of the two circuits because the risk of damage due to the two circuits remaining filled simultaneously and working in opposition to each other is very much reduced by the use of the usually soft and high slip coupling. This feature then also helps the problem of sudden offloading of diesel engine and its tendency to shoot up in speed at the change over, which difficulty is experienced in most cases in known transmission. The engine is never offloaded because before the torque convertor has fully disengaged, the fluid coupling has aready come into function and loaded the engine.

It can, therefore, be seen that without taking recourse to any elaborate control mechanism of filling and emptying of the various circuits, or providing the diesel engine with supersensitive and exacting governor controls, the change from one line to the other can be effected with smoothness i.e. without shock, continuity of torque and with the working of the engine under complete control.

At this stage, the engine speed has dropped to 85% with the vehicle at 70% speed through the high slip fluid coupling which in effect means that partial synchronisation has already taken place between the two complementary parts of the mechanical coupling. If the mechanical coupling consists of a plate clutch, it is no longer necessary to engage the plate clutch too instantaneously or else very slowly in order to avoid wear to clutch plates or to avoid shock loading because:

(i) Partial synchronisation has reduced already the difference between the input and output shafts to 15% and therefore relative slip between the clutch parts is now much less.

(ii) Partial synchronisation results in prolonging the life of clutch plates to the desired minimum in rail traction, as co-efficient of friction is high at low rubbing speeds.

(iii) When the clutch plates are being engaged, torque is already being transmitted through the fluid part of the fluid mechanical coupling and the clutch plates are only acting in addition. Thus the fluid part is helping actively while the clutch parts are progressively taking over and the result is technically very favourable. As the torque is split through two channels i.e. hydraulic blades and clutch plates respectively the torque through the fluid part of the coupling is progressively reduced. Immediately this happens, the fluid coupling slip reduces in accordance with well known fluid dynamic principles and the fluid acts to synchronize quickly the input shaft and the output shaft as more and more torque is transmitted through the plate clutch. Thus a high slip coupling initially acts as a partial synchroniser and then in combination with a plate clutch continues to act and aids total synchronisation up to the moment of complete engagement. It is therefore to be seen that an inefficient high slip coupling which by itself would be an unacceptable component in a rail traction transmission, and a simple plate clutch which also is an unacceptable mode of coupling in a rail transmission of high horsepower, when both are combined as herein described, result in a transmission unit more satisfactory than any known transmissions. Exceptionally high efficiency of transmission is achieved through the fluid mechanical coupling arranged for operation at a speed of about 70 to 90% of the maximum rail speed at which most of the fuel is consumed.

Similarly when using a claw clutch instead of the plate clutch a similar degree of technical progress is achieved.

It can thus be seen that a transmission unit for rail traction made according to this invention has all the advantages of high torque multiplication initially through the hydraulic line of power transmission, and when the vehicle has attained the speed range where maximum fuel consumption takes place, the hydraulic line is disengaged and the mechanical line engaged to obtain the advantages of the high transmission efficiency of the mechanical coupling.

I claim:

1. In a power transmission unit particularly for high horse powers such as those used in rail traction wherein between the driving and the driven shaft, in addition to at least one mechanical line of power transmission there is provided at least one parallel hydraulic line of power transmission and the respective lines of power transmission may be selectively rendered effective one at a time for the purpose of effecting change from the hydraulic line of transmission to the mechanical line of transmission (a) under full load and speed of the prime mover, (b) without any interruption of transmission of power, and (c) without causing shock to any part of the transmission unit; a driving shaft, a driven shaft and a parallel shaft, means for transmitting power from the driving shaft to the driven shaft through said parallel shaft, a hydrodynamic drive in said parallel shaft drive and means to render effective said hydrodynamic drive to transmit power from said driving shaft to said driven shaft; and means for transmitting power from said driving shaft to said driven shaft, comprising a hydrodynamic device between said driving shaft and said driven shaft, means to render effective said hydrodynamic device, whereby to brake the speed of one of said shafts relative to the other, and a mechanical coupling between said driving shaft and said driven shaft and means to render said mechanical coupling effective to directly couple the driving shaft and driven shaft.

2. In a power transmission unit particularly for high horse powers such as those used in rail traction wherein between the driving and the driven shaft, in addition to a mechanical line of power transmission there is provided a line of power transmission comprising a hydraulic transmission and the respective lines of power transmission may be engaged selectively one at a time for the purpose of effecting change from the hydraulic line of transmission to the mechanical line of transmission (a) under full load and speed of the prime mover (b) without causing shock to any part of the transmission unit; a driving shaft, a driven shaft, means for transmitting power from the driving shaft to the driven shaft through a hydraulic line of power transmission, a hydrodynamic drive in said hydraulic line of power transmission, means to render said hydrodynamic drive effective to transmit power from said driving shaft to said driven shaft through said hydraulic line of power transmission; and means for transmitting power from said driving shaft to said driven shaft, comprising a hydrodynamic device between said driving shaft and said driven shaft, means to render said hydrodynamic device effective whereby to brake the speed of one of said shafts relative to the other, and a mechanical coupling between said driving shaft and said driven shaft and means to render said mechanical coupling effective to directly couple the driving shaft and driven shaft.

3. In a power transmission unit particularly for high horse powers such as those used in rail traction wherein between the driving and the driven shaft, in addition to at least one mechanical line of power transmission there is provided at least one parallel line of power transmission comprising a hydraulic transmission and the respective lines of power transmission may be selectively rendered effective one at a time for the purpose of effecting change from the hydraulic line of transmission to the mechanical line of transmission (a) under full load and speed of the prime mover (b) without any interruption of transmission of power, and (c) without causing shock to any part of the transmission unit; a driving shaft, a driven shaft and a parallel line of power transmission, means for transmitting power from the driving shaft to the driven shaft through said parallel line of power transmission, a hydrodynamic drive in said parallel line, means to render effective the said hydrodynamic drive to transmit power from said driving shaft to said driven shaft through said parallel line; and means for transmitting power from said driving shaft to said driven shaft, comprising a hydrodynamic device between said driving shaft and said driven shaft, a casing surrounding said hydrodynamic device fixed on one of said shafts to rotate therewith and a mechanical coupling between said casing and one of said shafts and means to render said mechanical coupling effective to directly couple said casing with the other of said shafts.

4. In a power transmission unit, particularly for high horse powers, such as those used in rail traction wherein between the driving and driven shaft a reducing gear line of power transmission and a direct mechanical line of power transmission is provided, which permits direct mechanical connection and disconnection between the driving shaft and the driven shaft through the direct mechanical line of transmission (a) under full load and speed of the prime mover, (b) without any interruption of transmission power, and (c) without causing shock to any part of the transmission unit, a driving shaft, a driven shaft, a reducing gear line of power transmission and a direct mechanical line of power transmission betwen said driving and said driven shafts, means to connect and disconnect said driving and driven shaft through the reducing gear line of power transmission, a mechanical coupling device in the direct mechanical line of power transmission between the driving and driven shafts, a hydrodynamic device within said mechanical coupling device, means to render effective said hydrodynamic device to form a driving connection between said driving and said driven shaft whereby to brake the speed of one of said shafts relative to the other and means to render said mechanical coupling device in the direct mechanical line of power transmission effective to by-pass said hydrodynamic device and mechanically couple said driving shaft and said driven shaft.

5. In a power transmission unit particularly for high horse powers such as those used in rail traction wherein between the driving and the driven shaft, in addition to at least one mechanical line of power transmission there is provided at least one parallel hydraulic line of power transmission and the respective lines of power transmission may be selectively rendered effective one at a time for the purpose of effecting change from the hydraulic line of transmission to the mechanical line of transmission (a) under full load and speed of the prime mover, (b) without any interruption of transmission of power, and (c) without causing shock to any part of the transmission unit; a driving shaft, a driven shaft and a parallel shaft, means for transmitting power from the driving shaft to the driven shaft through said parallel shaft, a hydrodynamic drive in said parallel shaft drive and means to render effective said hydrodynamic drive to transmit power from said driving shaft to said driven shaft, and means for transmitting power from said driving shaft to said driven shaft, comprising a hydrodynamic device between said driving shaft and said driven shaft, said hydrodynamic device having a high slippage of about 15 to 20% and being insufficient to transmit power directly from said driving to said driven shaft, means to render effective said hydrodnnamic device, whereby to brake the speed of one of said shafts relative to the other, and a mechanical coupling between said driving shaft and said driven shaft and means to render said mechanical coupling effective to directly couple the driving shaft and driven shaft.

6. In a power transmission unit particularly for high horsepowers such as those used in rail traction wherein between the driving and the driven shaft, in addition to at least one mechanical line of power transmission there is provided at least one parallel hydraulic line of power transmission and the respective lines of power transmission may be selectively rendered effective one at a time for the purpose of effecting change from the hydraulic line of transmission to the mechanical line of transmission (a) under full load and speed of the prime mover, (b) without any interruption of transmission of power, and (c) without causing shock to any part of the transmission unit; a driving shaft, a driven shaft and a parallel shaft, means for transmitting power from the driving shaft to the driven shaft through said parallel shaft, a hydrodynamic drive in said parallel shaft drive and means to render effective said hydrodynamic drive to transmit power from said driving shaft to said driven shaft, and means for transmitting power from said driving shaft to said driven shaft, comprising a hydrodynamic device between said driving shaft and said driven shaft, means to render effective said hydrodynamic device, whereby to brake the speed of one of said shafts relative to the other, and a mechanical coupling comprising a friction type clutch between said driving shaft and said driven shaft and means to render said mechanical coupling effective to directly couple the driving shaft and driven shaft.

7. In a power transmission unit particularly for high horsepowers such as those used in rail traction wherein between the driving and the driven shaft, in addition to at least one mechanical line of power transmission there is provided at least one parallel hydraulic line of power transmission and the respective lines of power transmission may be selectively rendered effective one at a time for the purpose of effecting change from the hydraulic line of transmission to the mechanical line of transmission (a) under full load and speed of the prime mover, (b) without any interruption of transmission of power, and (c) without causing shock to any part of the transmission unit; a driving shaft, a driven shaft and a parallel shaft, means for transmitting power from the driving shaft to the driven shaft through said parallel shaft, a hydrodynamic drive in said parallel shaft drive and means to render effective said hydrodynamic drive to transmit power from said driving shaft to said driven shaft, and means for transmitting power from said driving shaft to said driven shaft, comprising a hydrodynamic device between said driving shaft and said driven shaft, means to render effective said hydrodynamic device, whereby to brake the speed of one of said shafts relative to the other, and a mechanical coupling comprising a fluid operated friction type clutch having an engagement and disengagement means between said driving shaft and said driven shaft, a first fluid pump operating off of said input shaft and a second fluid pump operating off of said output shaft, both of which provide fluid to a common conduit leading to said friction clutch, disengagement means to provide for continuous disengagement of said clutch until such time as positive engagement is desired, and means to render said mechanical coupling effective to directly couple the driving shaft and driven shaft.

8. In a power transmission unit particularly for high horse powers such as those used in rail traction wherein between the driving and the driven shaft, in addition to at least one mechanical line of power transmission there is provided at least one parallel hydraulic line of power transmission and the respective lines of power transmission may be selectively rendered effective one at a time for the purpose of effecting change from the hydraulic line of transmission to the mechanical line of transmission (a) under full load and speed of the prime mover, (b) without any interruption of transmission of power, and (c) without causing shock to any part of the transmission unit; a driving shaft, a driven shaft and a parallel shaft, means for transmitting power from the driving shaft to the driven shaft through said parallel shaft, a hydrodynamic drive in said parallel shaft drive and means to render effective said hydrodynamic drive to transmit power from said driving shaft to said driven shaft, and means for transmitting power from said driving shaft to said driven shaft, comprising a hydrodynamic device between said driving shaft and said driven shaft, means to render effective said hydrodynamic device, whereby to brake the speed of one of said shafts relative to the other, and a mechanical coupling comprising a fluid operated friction type clutch having an engagement and disengagement means between said driving shaft and said driven shaft, a first fluid pump operating off of said input shaft and a second fluid pump operating off of said output shaft, both of which provide fluid to a common conduit leading to said friction clutch, disengagement means to provide for continuous disengagement of said clutch until such time as positive engagement is desired and conduit means from said second pump to said clutch engagement means whereby the clutch may be selectively engaged upon reaching a predetermined shaft speed but not before to directly couple the driving shaft and driven shaft.

9. In a power transmission unit particularly for high horse powers such as those used in rail traction wherein between the driving and the driven shaft, in addition to at least one mechanical line of power transmission there is provided at least one parallel hydraulic line of power transmission and the respective lines of power transmission may be selectively rendered effective one at a time for the purpose of effecting change from the hydraulic line of transmission to the mechanical line of transmission (a) under full load and speed of the prime mover, (b) without any interruption of transmission of power, and (c) without causing shock to any part of the transmission unit; a driving shaft, a driven shaft and a parallel shaft, means for transmitting power from the driving shaft to the driven shaft through said parallel shaft, a hydrodynamic drive in said parallel shaft drive and means to render effective said hydrodynamic drive to transmit power from said driving shaft to said driven shaft, and means for transmitting power from said driving shaft to said driven shaft, comprising a hydrodynamic device between said driving shaft and said driven shaft, means to render effective said hydrodynamic device, whereby to brake the speed of one of said shafts relative to the other, and a mechanical coupling comprising a fluid operated friction type clutch having an engagement and disengagement means between said driving shaft and said driven shaft, a first fluid pump operating off of said input shaft and a second fluid pump operating off of said output shaft, both of which provide fluid to a common conduit leading to said friction clutch, disengagement means to provide for continuous disengagement of said clutch until such time as positive engagement is desired, conduit means from said second pump to said clutch engagement means whereby the clutch may be selectively engaged upon reaching a predetermined shaft speed but not before to directly couple the driving shaft and driven shaft and means operated by said second pump for actuating relays at predetermined speeds.

10. In a power transmission unit particularly for high horse powers such as those used in rail traction wherein between the driving and the driven shaft, in addition to at least one mechanical line of power transmission there is provided at least one parallel hydraulic line of power transmission and the respective lines of power transmission may be selectively rendered effective one at a time for the purpose of effecting change from the hydraulic line of transmission to the mechanical line of transmission (a) under full load and speed of the prime mover, (b) without any interruption of transmission of power, and (c) without causing shock to any part of the transmission unit; a driving shaft, a driven shaft and a parallel shaft, means for transmitting power from the driving shaft to the driven shaft through said parallel shaft, a hydrodynamic drive in said parallel shaft drive and means to render effective said hydrodynamic drive to transmit power from said driving shaft to said driven shaft, and means for transmitting power from said driving shaft to said driven shaft, comprising a hydrodynamic device between said driving shaft and said driven shaft, means to render effective said hydrodynamic device, whereby to brake the speed of one of said shafts relative to the other, and a mechanical coupling comprising a fluid operated friction type clutch having an engagement and disengagement means between said driving shaft and said driven shaft, a first fluid pump operating off of said input shaft and a second fluid pump operating off of said output shaft, both of which provide fluid to a common conduit leading to said friction clutch, disengagement means to provide for continuous disengagement of said clutch until such time as positive engagement is desired, conduit means from said second pump to said clutch engagement means whereby the clutch may be selectively engaged upon reaching a predetermined shaft speed but not before to directly couple the driving shaft and driven shaft, and a pneumatic fluid control system comprising a pneumatically actuated master control valve to pass fluid from said first pump to a second pneumatically activated valve which selectively distributes said fluid to fill said hydrodynamic drive and said hydrodynamic device as desired, and a third pneumatically controlled valve in said conduit to said clutch engagement for permitting the selective engagement of said clutch.

References Cited in the file of this patent

UNITED STATES PATENTS

| | | |
|---|---|---|
| 1,827,348 | Bing | Oct. 13, 1931 |
| 2,671,543 | Bosch | Mar. 9, 1954 |
| 2,748,621 | Sinclair | June 5, 1956 |
| 2,876,656 | Herndon | Mar. 10, 1959 |
| 2,943,516 | Herndon | July 5, 1960 |
| 2,970,498 | Murray et al. | Feb. 7, 1961 |

FOREIGN PATENTS

| | | |
|---|---|---|
| 793,263 | Great Britain | Apr. 16, 1958 |